(12) United States Patent
Byers et al.

(10) Patent No.: US 12,465,987 B2
(45) Date of Patent: Nov. 11, 2025

(54) SOLDERABLE COATING FOR ADDITIVE MANUFACTURED OXIDIZING METALS

(71) Applicant: HONEYWELL FEDERAL MANUFACTURING & TECHNOLOGIES, LLC, Kansas City, MO (US)

(72) Inventors: Kyle J. Byers, Leawood, KS (US); Daniel Scott Krueger, Liberty, MO (US); Michael Walsh, Overland Park, KS (US); William Price, Easton, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 835 days.

(21) Appl. No.: 16/720,445

(22) Filed: Dec. 19, 2019

(65) Prior Publication Data
US 2021/0187646 A1    Jun. 24, 2021

(51) Int. Cl.
| | |
|---|---|
| *B23K 1/20* | (2006.01) |
| *B23K 1/00* | (2006.01) |
| *B23K 103/10* | (2006.01) |
| *B23K 103/12* | (2006.01) |
| *B23K 103/14* | (2006.01) |
| *B33Y 10/00* | (2015.01) |
| *B33Y 70/00* | (2020.01) |
| *C22C 14/00* | (2006.01) |
| *C23C 14/16* | (2006.01) |
| *H01Q 9/26* | (2006.01) |

(52) U.S. Cl.
CPC ............. *B23K 1/20* (2013.01); *B23K 1/0008* (2013.01); *B33Y 70/00* (2014.12); *C22C 14/00* (2013.01); *C23C 14/16* (2013.01); *B23K 2103/10* (2018.08); *B23K 2103/12* (2018.08); *B23K 2103/14* (2018.08); *B33Y 10/00* (2014.12); *H01Q 9/26* (2013.01)

(58) Field of Classification Search
None
See application file for complete search history.

(56) References Cited

U.S. PATENT DOCUMENTS

| | | |
|---|---|---|
| 5,282,943 A | 2/1994 | Lannutti et al. |
| 8,821,831 B2 | 9/2014 | Takayasu et al. |
| (Continued) | | |

FOREIGN PATENT DOCUMENTS

CN    107815619 A  *  3/2018

OTHER PUBLICATIONS

Shamvedi, Deepak, "Design of Microwave Components using Direct Metal Laser Sintering", Sep. 2018, Waterford Institute of Technology School of Engineering Technology. (Year: 2018).*

(Continued)

*Primary Examiner* — Xiaobei Wang
(74) *Attorney, Agent, or Firm* — Hovey Williams LLP (57) ABSTRACT

A method of manufacturing a compound object, such as an antenna, is disclosed. The method includes creating, via additive manufacturing, a first component formed at least in part of an oxidizing metal; applying, via vapor deposition, a solderable coating to at least a portion of the first component; and soldering at least a portion of the first component to a second component by applying a solder to the solderable coating of the first component. The oxidizing metal may be a titanium alloy, such as Ti-6Al-4V. The solderable coating may include copper and/or tin-lead.

17 Claims, 3 Drawing Sheets

(56) References Cited

U.S. PATENT DOCUMENTS

| | | | |
|---|---|---|---|
| 8,956,510 B2 | 2/2015 | Derrig | |
| 2005/0266670 A1* | 12/2005 | Lin | H01L 24/94 |
| | | | 257/E21.705 |
| 2008/0248320 A1 | 10/2008 | Grohmann et al. | |
| 2011/0048954 A1 | 3/2011 | Rod | |
| 2014/0061165 A1* | 3/2014 | Stempfer | B23K 9/08 |
| | | | 219/76.16 |
| 2017/0113297 A1* | 4/2017 | Davis | C25D 7/00 |
| 2020/0136223 A1* | 4/2020 | DeGraw | C25D 7/0607 |

OTHER PUBLICATIONS

Woodford, Chris, "Antennas and transmitters", Sep. 12, 2008, <https://www.explainthatstuff.com/antennas.html>, as recovered by <https://web.archive.org/web/20081027220849/https://www.explainthatstuff.com/antennas.html>. (Year: 2008).*

Knack, Kella, "Building a Faraday Cage to Contain EMI, Part 1", Feb. 8, 2021, <https://resources.altium.com/p/building-a-faraday-cage-to-contain-emi-part-1> (Year: 2021).*

Byers et al., "Metal Additive Manufactured Freeform Antenna", Nov. 2018, IEEE Antennas and Wireless Propagation Letters, vol. 17 No. 11, pp. 2104-2108. (Year: 2018).*

An article titled Hybrid Diffusive/PVD Treatments to Improve the Tribological Resistance of Ti-6AI-4V; https://content.jospress.com/articles/bio-medical-materials-and-engineering/bme845.

\* cited by examiner

SOLDERABLE COATING FOR ADDITIVE MANUFACTURED OXIDIZING METALS

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Titanium alloys and other oxidizing metals are increasingly being used for structural components due to advantages in their mechanical properties. Certain of these structural components are being formed by various additive manufacturing processes. The additive manufacturing processes are capable of creating components that are not practical to manufacture using traditional methods. This can include thin, overhanging structures that are advantageous in various uses such as antennas.

However, titanium alloys oxidize and are not solderable, so antennas created from such titanium alloys cannot be secured to the other components of the antenna via soldering.

The background discussion is intended to provide information related to the present invention which is not necessarily prior art.

SUMMARY

The present invention solves the above-described problems and other problems by providing a distinct advance in the art of additive manufacturing. Embodiments of the invention allow additively manufactured components formed from oxidizing metals to be successfully soldered to other components. More particularly, the present invention provides methods of and assemblies for coating additive manufacturing that enable soldering of components formed from oxidizing metals. This allows the oxidizing metal to be soldered to other components and allow electrical conductivity therethrough. An example field of use is antennas.

A first embodiment of the invention is a method of manufacturing a compound object. The method comprises creating, via additive manufacturing, a first component formed at least in part of an oxidizing metal; applying, via vapor deposition, a solderable coating to at least a portion of the first component; and soldering at least a portion of the first component to a second component by applying a solder to the solderable coating of the first component. The oxidizing metal may be a titanium alloy, such as Ti-6Al-4V. The solderable coating may include copper and/or tin-lead.

A second embodiment of the invention is a method of manufacturing an antenna. The method comprises applying, via vapor deposition, a solderable coating to at least a portion of a radio frequency device formed at least in part of an oxidizing metal; and soldering at least a portion of the radio frequency device to a radio frequency transmission line by applying a solder to the solderable coating of the radio frequency device. The radio frequency device was at least partially formed via additive manufacturing.

A third embodiment of the invention is an antenna comprising a radio frequency device and a radio frequency transmission line. The radio frequency device is formed at least in part of an oxidizing metal. The radio frequency device was at least partially formed via electron beam additive manufacturing. At least a portion of the radio frequency device presents a solderable coating thereon. The solderable coating was at least partially formed via a physical vapor deposition process. The radio frequency transmission line is soldered to at least a portion of the radio frequency device to the radio frequency transmission line by applying a solder to the solderable coating of the radio frequency device.

Another embodiment of the invention is an additive manufacturing assembly configured to manufacture the first component. Still another embodiment of the invention is a physical vapor deposition machine configured to apply the physical vapor deposition coating. Yet still another embodiment of the invention is a solder machine configured to secure adhere to the first component via the physical vapor deposition coating.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
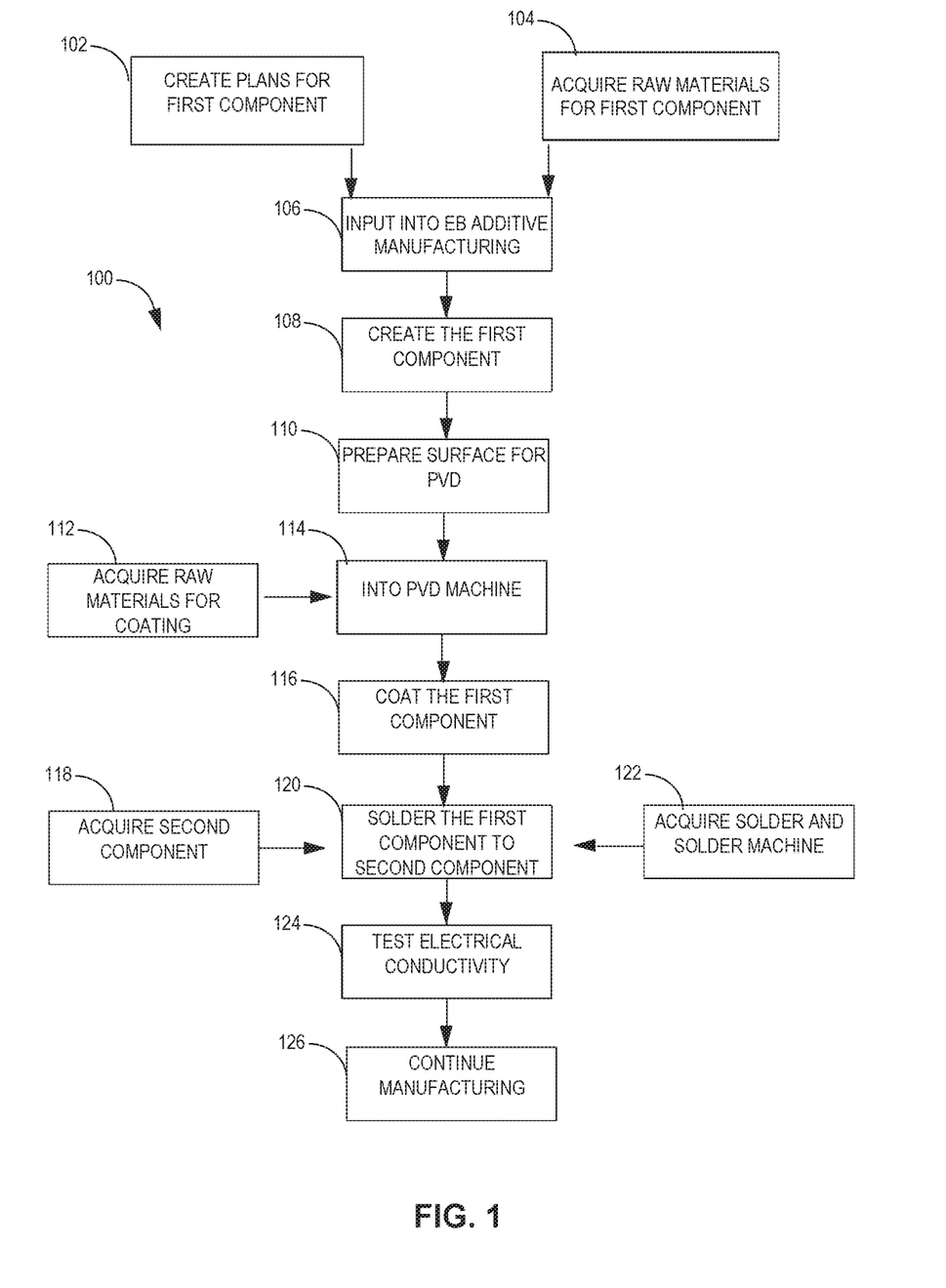
FIG. 1 is a flowchart illustrating a method of manufacturing a compound object according to an embodiment of the present invention.

Turning to FIG. 1, a method 100 of manufacturing a compound object is shown and described. The compound object is formed of two or more components. At least one of the components is formed via an additive manufacturing process, such as electron beam additive manufacturing. At least two of the components are secured via soldering.

The method 100 is described below, for ease of reference, as being executed by exemplary devices and components discussed more below. For example, the various steps may be performed through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

It should be appreciated that while the below discussion includes steps performed by an "operator" the various steps may be performed by two or more operators, or by one or more processors, or by one or more devices. The term "operator" is thus used for ease of understanding by the reader but should not limit the claims to steps performed by a single entity.

In Step 102, an operator will create plans for the first component. The plans may include sizes, shapes, materials, and assembly steps for the first component. These characteristics may be based at least in part on desired properties which the first component will have. For example, the material may be selected based upon strength and hardness requirements for the first component. The assembly steps may be selected based upon the manner which can create the desired size and shape in the desired material.

In Step 104, an operator will acquire raw materials for the first component. The raw material may be in any of numerous forms configured to be utilized by the below-discussed additive manufacturing machine. In some instances, the raw material is in a wire form. In some instances, the raw material is in a powder form. In still other instances, the raw material may be in another form.

In embodiments of the invention, at least one of the raw materials is an oxidizing metal. An oxidizing metal is a metal that is susceptible to metal oxidization. Metal oxidation is an ionic chemical reaction that occurs upon the surface of the metal in the presence of oxygen (such as found in ambient air, water, acids, or other materials). Electrons from the oxidizing metal atoms are transferred to the oxygen atoms. The now-negatively-charged oxygen atoms enter or adhere to the metal surface. The negatively charged oxygen atoms form an oxide surface on the metal and cause metal corrosion. Further, the oxidation may prevent or damage solder that would otherwise adhere to the oxidizing metal.

In some embodiments, the oxidizing metal is titanium. Titanium has the highest strength-to-density ratio of any metallic element. Titanium also has a relatively high melting point of more than 3,000 degrees Fahrenheit. Titanium oxidizes immediately upon exposure to air, or other source of oxygen.

In some embodiments, the oxidizing metal is a titanium alloy. Titanium can be alloyed with iron, aluminum, vanadium, molybdenum, and other elements. Titanium alloys are typically strong and lightweight, making them ideal for various applications. Titanium alloys are thus, for example, common in antenna industries, aerospace industries, military industries, automotive industries, medical prosthetics and implant industries, sporting goods industries, jewelry industries, electronics industries, and other industries. Titanium alloys are generally classified into four categories: alpha alloys which contain neutral alloying elements, such as tin; near-alpha alloys which contain small amounts of ductile beta stabilizers; alpha-and-beta alloys which contain a combination of alpha and beta stabilizers; and beta alloys which contain a sufficient amount of beta stabilizers. Titanium alloys may also be available in any of numerous grades as specified in American Society for Testing and Materials (ASTM) International standards.

In some embodiments, the titanium alloy is Ti-6Al-4V. Ti-6Al-4V, having UNS designation R56400, is an alpha-and-beta alloy of titanium. For example, Ti-6Al-4V accounts for almost half of all alloys used in aircraft applications. Ti-6Al-4V is discussed more in ASTM Standard F1472, incorporated herein by reference in its entirety.

In some embodiments, the oxidizing metal is stainless steel. While stainless steel is notable for its resistance to oxidation, it is not immune and various applications and grades may benefit from additional solderability provided by embodiments of the invention. There are hundreds of different types and grades of stainless steel that may be utilized as the oxidizing metal described herein. A few example grades will be discussed. A first example is 316L, which includes less carbon than standard 316 stainless steel for better usage in high-temperature and high-corrosion environments. A second example is 304L, which also includes less carbon than standard 304 stainless steel. Still another example is 17-4PH, which is the most widely used precipitation-hardening stainless steel.

Numerous other metals may be the oxidizing metal discussed herein. In some embodiments, the oxidizing metal is tungsten or tungsten alloys. Tungsten has the highest melting point of any pure metal, making it common for numerous commercial and industrial applications. In some embodiments, the oxidizing metal is Inconel 625, which is a nickel-based alloy with high strength and high temperature-resistance. In some embodiments, the oxidizing metal is Hiperco, which is an alloy of cobalt, iron, vanadium and other metals. In some embodiments, the oxidizing metal is an aluminum alloy such as Al-10Si-Mg, which is configured specifically for additive manufacturing applications.

In Step 106, an operator will prepare an electron beam additive manufacturing machine. Electron beam additive manufacturing is a type of additive manufacturing (commonly referred to as 3D printing) for metal components. An electron beam additive manufacturing machine will place the raw material, which is typically in the form of a wire and/or a powder, under a vacuum and apply an electron beam for fusing the raw material. For wire-based systems, the electron beam melts the wire onto a surface (and/or other segment of previously melted wire). The wire-based metallic feed stock is added and melted layer by layer until the component in fully produced. Electron beam additive manufacturing is commonly used for titanium alloys.

In this step, the operator may also input, acquire, or otherwise supply the plans to the electron beam additive manufacturing machine. In this step, the operator may also add, resupply, or otherwise supply the raw materials to the electron beam additive manufacturing machine.

Figure 2:
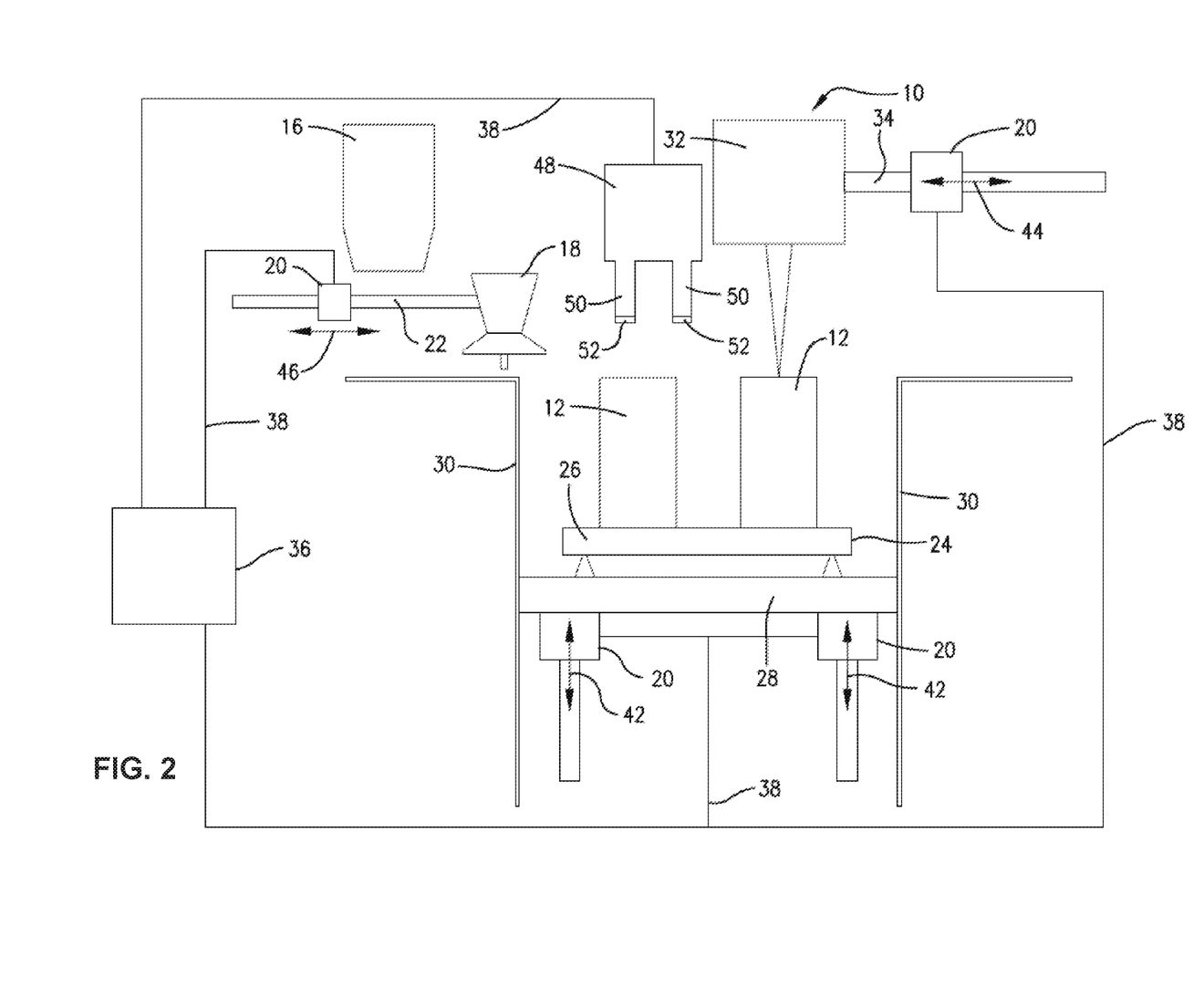
FIG. 2 is a diagram showing an additive manufacturing machine.

In Step 108, the operator will create the first component via electron beam additive manufacturing. An exemplary additive manufacturing system is shown in FIG. 2 and will now be discussed in detail before returning to the exemplary method of FIG. 1. As illustrated in FIG. 2, an additive manufacturing apparatus 10 may comprise at least one powder hopper 16, a plurality of actuators 20, a powder deposition device 18, a build platform 24, a directed energy source 32, a gas regulator 48, and a controller 36, as described in detail below. The additive manufacturing powder 12 may comprise any number of materials including material that has a high melting point or low melting point, or a combination of both. The additive manufacturing powder 12 may include one or more of the following materials: metal and metal alloys (as discussed above), carbon fiber, silicon, plastic, or other material in powder form. In one example embodiment of the invention, the additive manufacturing powder 12 is used to form a precipitation-hardenable metal part.

One or more types of the additive manufacturing powder 12 may be stored in the hopper 16, which may be a single hopper or may include separate compartments of a multi-material powder hopper. In embodiments of the invention where multiple powders are used, the powder hopper 16 may house the different types of powder in separate containers or compartments, or may use walls to keep the powders separate. The powder hopper 16 may also comprise a nozzle, or plurality of nozzles, through which powder is selectively supplied. The nozzle or plurality of nozzles can supply powder using solenoids, actuators, or a combination thereof. In one preferred embodiment, the nozzle, or plurality of nozzles, supply powder to a powder deposition device 18 positioned below the nozzle, or plurality of nozzles.

The actuators 20 may be controlled hydraulically, electrically, or manually. For example, the actuators 20 may comprise electric motors, pumps, circuits, robotic parts, mechanical actuation parts, hydro-mechanical parts, electro-mechanical parts, and the like. In some embodiments of the invention, the actuators 20 may comprise a first actuator configured to actuate travel of a portion of the build platform 24, a second actuator configured to actuate travel of the directed energy source 32 relative to the build platform 24, and a third actuator configured to actuate travel of at least a portion of the powder deposition device 18 relative to the build platform 24, as illustrated in FIG. 2. In some embodiments of the invention, the first actuator may be configured to actuate travel in directions 42 substantially perpendicular to directions 44,46 of travel provided by the second and third actuators, respectively. Furthermore, in some embodiments of the invention, the actuators may be configured to provide travel in two or more directions. Note that the actuators described herein are merely exemplary and do not limit the scope of the invention. For example, the build platform could remain stationary while only the directed energy source 32 and the deposition device 18 are actuated. Alternatively, the directed energy source 32 may remain stationary while the build platform is actuated toward and/or away from the directed energy source 32.

In some preferred embodiments of the invention, the deposition device 18 contains multiple selectively openable compartments in which it stores powder supplied by the powder hopper 16. In another preferred embodiment, the deposition device 18 contains only one powder compartment that stores the type of powder to be immediately deposited. In yet another preferred embodiment, the deposition device 18 is coupled to the hopper 16 so that it deposits the type of powder selectively supplied by the hopper 16. Furthermore, the powder deposition device 18 may comprise a nozzle, or plurality of nozzles, which may be turned on or off according to commands received by the controller 36, thereby applying a desired amount and pattern of powder on the build platform 24. As noted above, the nozzle or plurality of nozzles can supply powder using solenoids, actuators, or a combination thereof.

Figure 4:
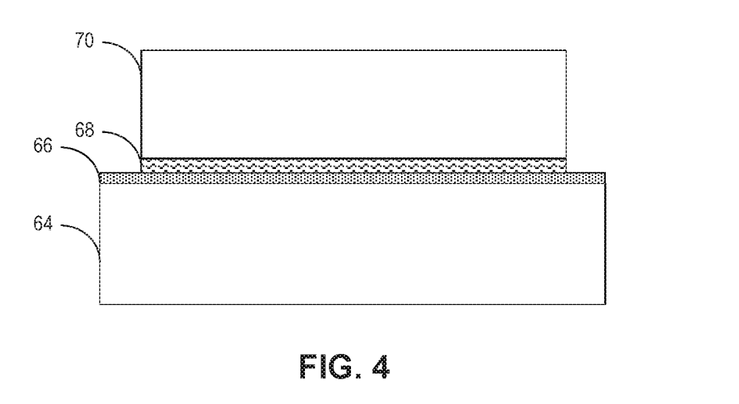
FIG. 4 is a diagram illustrating a first component soldered to a second component via a solderable coating on the first component.

The powder deposition device 18 may comprise at least one of the actuators 20 (such as the third actuator) and/or a track 22 upon which the deposition device 18 may move to selectively deposit the powder. The actuators 20 may actuate the movement of the deposition device 18 on the track 22, moving the position of the deposition device 18 over any region above a build platform 24. As illustrated in FIG. 4, in one embodiment the deposition device 18 may be a multi-material dispensing rake 18.

The build platform 24 broadly comprises a horizontal build plate 26 or base plate and at least one vertical wall surrounding the build plate 26. In one preferred embodiment the build plate 26 sits on top of a rectangular, horizontal elevator plate 28, where four vertical walls 30 enclose the elevator plate 28, as illustrated in FIG. 1. The elevator plate 28 is vertically movable using actuators 20 (such as the first actuator above), where the elevator plate 28 is vertically movable relative to the four vertical walls 30.

The directed energy source 32 may be any kind as is known in the art including but not limited to a laser, electron beam, or other source of directed energy. The energy source 32 may be movably attached to a track 34 such that the energy source 32 can move anywhere in the three-dimensional space above the build platform 24. In one embodiment, the energy source 32 may be movable within a two-dimensional plane parallel to and above the build platform 24. The energy source 32 may also be movable such that it can direct its energy in any direction or angle relative to the plane parallel to the build platform 24. The movement, position, and direction of the energy source 32 may be manually controlled or caused by one or more of the actuators 20 of the types described above (such as the second actuator above). The actuators 20 of the directed energy source 32 may be controlled by the controller 36.

The gas regulator 48 may include and/or be connected to one or more gas sources and may also include a plurality of ports 50 and valves 52, controlling delivery of cover gases flowing over and/or substantially surrounding one or more layers of the additive manufacturing powder on the build platform 24. The gas regulator 48 may be controlled manually via a user interface including switches, knobs, or other various controls known in the art for opening or closing the valves 52 and/or otherwise controlling the flow of the cover gases through the ports 50. The cover gases may include any inert gases, such as nitrogen, argon, and the like, or any combination thereof.

The controller 36 may comprise any number of combination of controllers, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information accessed and/or generated by the apparatus 10. The controller 36 may control operational sequences, power, speed, motion, or movement of the actuators 20 and/or temperature of the directed energy source 32.

Furthermore, the controller 36 may also control or command the gas regulator 48, and may specifically control gas circulation, venting, and/or flow rate of the cover gas used during melting or sintering of various portions or layers of the additive manufacturing powder 12, as later described herein. In some embodiments of the invention, the apparatus 10 may include a plurality of separate controllers for independently controlling various functions described herein. For example, in some embodiments of the invention, the gas regulator 48 may be an external gas regulator with its own independent controller, separate from a controller for the actuators 20 and/or the directed energy source 32.

The controller 36 may be configured to implement any combination of algorithms, subroutines, computer programs, or code corresponding to method steps and functions described herein. The controller 36 and computer programs described herein are merely examples of computer equipment and programs that may be used to implement the present invention and may be replaced with or supplemented with other controllers and computer programs without departing from the scope of the present invention. While certain features are described as residing in the controller 36, the invention is not so limited, and those features may be implemented elsewhere. For example, databases may be accessed by the controller 36 for retrieving CAD data or other operational data without departing from the scope of the invention.

The controller 36 may implement the computer programs and/or code segments to perform various method steps described herein. The computer programs may comprise an ordered listing of executable instructions for implementing logical functions in the controller 36. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card. It should also be appreciated that the below discussed physical vapor deposition machine may include a similar controller.

The residential or external memory may be integral with the controller 36, stand-alone memory, or a combination of both. The memory may include, for example, removable and non-removable memory elements such as RAM, ROM, flash, magnetic, optical, USB memory devices, MMC cards, RS MMC cards, SD cards such as microSD or miniSD, SIM cards, and/or other memory elements. As illustrated in FIG. 1, electrical conduits 38 and/or communication conduits 38 may also provide electrical power to the actuators 20, the powder hopper 16, the deposition device 18, the nozzles or nozzle solenoids, the build platform 24, the directed energy source 32, and/or the gas regulator 48. Additionally or alternatively, the conduits 38 may be configured to provide communication links between the controller 36 and any of the actuators 20, the powder hopper 16, the deposition device 18, the nozzles or nozzle solenoids, the build platform 24, the directed energy source 32, and/or the gas regulator 48.

In use, the additive manufacturing apparatus 10 may selectively deposit the additive manufacturing powder 12 using the deposition device 18 and selectively melt or sinter the powder 12 using the directed energy source 32 to form a part 40, layer by layer. Specifically, the depositing and melting or sintering steps may be repeated one or more times, until the part 40 is complete. At various points during this process, the air regulator 48 may provide various cover gases or mixtures thereof to cover the powder 12 deposited on the build platform 24. For example, the cover gas may be changed for melting or sintering different portions of a single layer and/or changed between depositions of one or more layers, depending on desired structural properties or desired microstructure of the part 40 at various locations and/or for various layers thereof.

Returning to the above-discussed method of FIG. 1, the operator will continue the process once the component has been manufactured and cured. In Step 110, the operator will prepare a surface of the first component for physical vapor deposition. This step may be performed by finishing, cleaning, polishing, or otherwise preparing the surface.

In some embodiments, the surface prepared is substantially the same size and shape as the area to be soldered. In these embodiments, the below-discussed steps of soldering will be performed on only a portion of the first component (e.g., that portion which will be applied to a second component). Thus, only a portion of the first component may be prepared for the physical vapor deposition process. In some instances, this may include covering, treating, or otherwise preventing the physical vapor deposition coating from adhering to one or more surfaces of the first component.

In other embodiments, the surface prepared is substantially larger that the area to be soldered. In these embodiments, more than the surface to be soldered will be coated via the physical vapor deposition process. In these embodiments, the physical vapor deposition coating may provide additional benefits to the first component, other than the added solderability discussed herein. These additional benefits may include hardness and resistance to corrosion.

In Step 112, the operator will acquire raw materials for the coating. In embodiments, the raw materials may be referred to as a sputtering target. The sputtering target may include one or more raw materials that will form the physical vapor deposition coating. Examples of the materials from which sputtering targets may be formed include, but are not limited to, aluminum, chromium, copper, indium, lead, nickel, silicon, tantalum, titanium, tin, tin-lead tungsten, yttrium, zinc, and zirconium; as well as alloys or other compounds thereof. In some embodiments, two or more raw materials may be utilized together in forming the physical vapor deposition coating. For example, titanium, copper, and tin-lead may be utilized together in the physical vapor deposition coating. The selected raw material(s) will allow greater solderability between the first component and the second component, as compared to the solderability of the first component without the coating.

In Step 114, the operator will place the first component and the raw materials for the coating into the physical vapor deposition machine. The operator may also input various instructions into the physical vapor deposition machine, such as instructions related to the thickness desired, other desired characteristics of the coating, various timing characteristics for the physical vapor deposition process, or other information. The operator may place the first component onto or into a holder which will rotate, pivot, or otherwise move during the physical vapor deposition process to ensure an even coating. Any of various raw materials may be utilized for the vaporized coating. As examples, the raw material may be Ti—Cu—SnPb and/or AuSn.

In Step 116, the operator will coat the first component with the coating. The physical vapor deposition machine will perform a physical vapor deposition process on the first component and apply a physical vapor deposition coating. The physical vapor deposition process will apply a thin layer of the raw material, typically in the range of a few nanometers to a few micrometers, to the first component. The physical vapor deposition process has three general steps. First, a portion of the raw material (in the form of the sputtering target) is vaporized. This is performed with the assistance of a high temperature vacuum and/or gaseous plasma. Second, the vaporized coating is transported to the first component (which may be referred to as a substrate surface). The vaporized coating may be moved via a flowing gas (such as argon). The first component may also be rotated, pivoted, or otherwise moved to allow for an even coating on the entirety of the surface. Third, the vaporized coating will condense on the first component to form the physical vapor deposition coating. Thus, the raw material goes from a condensed phase in the sputtering target, to a gaseous phase, and back to a condensed phase on the first component.

In other embodiments, another type of vacuum deposition may be used to create the vaporized coating. Physical vapor deposition is one of numerous processes that deposit layers of material on the solid surface of the first component. Other vacuum deposition techniques utilized may include chemical vapor deposition, which uses a chemical vapor instead of the solid source discussed above. In chemical vapor deposition, the first component is exposed to one or more volatile precursors, which react and/or decompose on the first component to produce the coating. Still another vacuum deposition technique utilized may include atomic layer deposition. In atomic layer deposition, the first component is exposed to two or more chemical precursors in a sequential pattern. The process is repeated such the final coating is composed of multiple sub-layers of the individual precursors.

In some embodiments, the vaporized coating discussed above is a first coating that is a template for a second coating. For example, the second coating may be an electroplating coating. Electroplating (also known as electrodeposition) is a process which utilizes electric current to form a thin metal coating on the first component. The first component and a metal of the second coating are immersed in an electrolyte solution. A power source oxidizes the coating metal to dissolve in the electrolyte solution and eventually for the second coating on the first component. As another example, the second coating may be an electroless-plating coating. Electroless plating is similar to electroplating except that no external electrical power is used. It should be appreciated that the "solderable coating" may be a combination of the first coating and the second coating utilizing two or more coating techniques, and that various combinations of coating may be utilized within the scope of the invention.

The vaporized coating presents a thickness. In some embodiments the thickness of the vaporized coating is at least one micron, at least five microns, at least ten microns, at least fifteen microns, or at least twenty microns. In some embodiments, the thickness of the vaporized coating is in a range of five to fifteen microns. In some embodiments, the thickness of the vaporized coating is at most five microns, at most ten microns, at most fifteen microns, or at most twenty microns.

In Step 118, the operator will acquire the second component. The second component is the component to which the coated first component will be soldered. In some embodiments, the second component is also formed by additive manufacturing, such as via the steps discussed above. In some of these embodiments, the second component will also be coated via the physical vapor deposition process described above. In other embodiments, the second component is formed via another manufacturing process.

In Step 120, the operator will acquire solder and soldering tools. In Step 122, the operator will solder the first component to the second component. The operator will secure the first component to the second component by selectively melting a filler metal (commonly referred to as solder) adjacent or proximate to an interface between the first component and the second component. Typically, the first component will present at least one complementary surface to the second component. The first component will be pressed against, held near, or otherwise situated adjacent or proximate to the second component. Heat will be applied to the solder, which has a lower melting point that the material forming the first component and the second component. The solder will then be melted by the soldering tool such that the solder can flow between the first component and the second component. The solder will cool and adhere to the coating on the first component and/or the second component to securely hold.

The physical vapor deposition coating allows the solder to adhere completely to the first component, despite the first component being formed at least partially of an oxidizing metal. The solder, in some embodiments, also allows for electricity to flow from the first component into the second component, and/or from the second component into the first component.

In Step 124, the operator will test the compound object to determine the electrical conductivity through the first component and the second component. The compound object comprises the first component soldered to the second component. The compound object may further include other components which may be added to the first component and or the second component. In Step 126, the compound object may be further assembled or constructed, if applicable.

Figure 3:
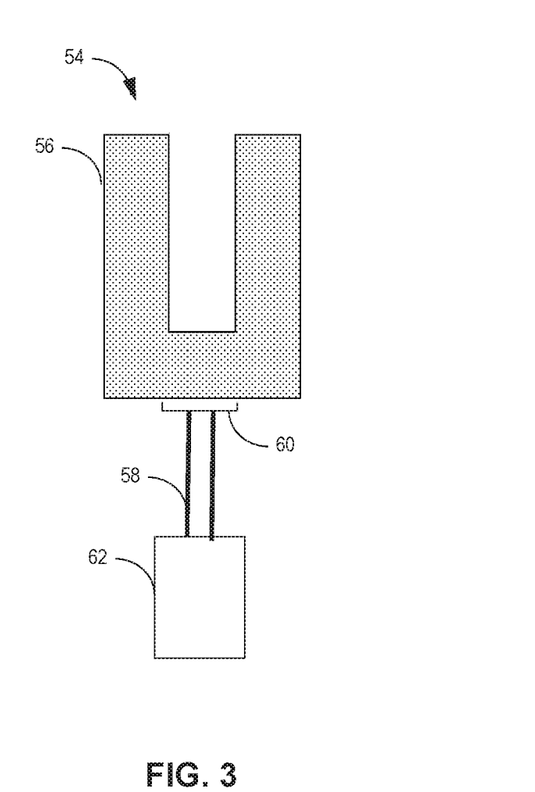
FIG. 3 is a diagram illustrating an antenna according to another embodiment of the present invention.

Turning now to FIG. 3, an exemplary field of use for the invention will be discussed. Some embodiments of the invention are directed to an exemplary use case of antennas. In these embodiments, the first component and the second component are components of the antenna, which are secured together via soldering at least partially on the physical vapor deposition coating of the first component.

Antennas are used for long range communication or detection. Antennas couple a transmitter to a medium (such as the air), or from the medium to a receiver. An antenna is an electromagnetic radiator. A transmitting antenna creates an electromagnetic field that proceeds out from the transmitting antenna. A receiving antenna converts the electromagnetic wave into electrical signal that are applied to an input of the receiver. Some antennas may operate as both a transmitting and a receiving antenna. An antenna includes one or more conductors (sometimes referred to as an array). Antennas may be characterized in three broad categories: omni-directional antennas, directional antennas, and semi-directional antennas.

Turning to FIG. 3, an exemplary embodiment of the invention is an antenna 54 comprising a radio frequency device 56 and a radio frequency transmission line 58. The radio frequency device 56 is formed at least in part of an oxidizing metal, as discussed above. The radio frequency device 56 was at least partially formed via electron beam additive manufacturing, as discussed above. At least a portion of the radio frequency device 56 presents a solderable coating thereon (illustrated as partial dot shading). The solderable coating was at least partially formed via a physical vapor deposition process, as discussed above. The radio frequency transmission line 58 is soldered to at least a portion of the radio frequency device 56 to the radio frequency transmission line 58 by applying a solder 60 to the solderable coating of the radio frequency device 56. The radio frequency transmission line 58 may be further connected to a transceiver 62 or other object.

Still another embodiment of the invention is a method of manufacturing an antenna. The method comprises acquiring a radio frequency device 56 formed at least in part of an oxidizing metal; applying, via physical vapor deposition, a solderable coating to at least a portion of the radio frequency device 56; acquiring a radio frequency transmission line 58; and soldering at least a portion of the radio frequency device 56 to the radio frequency transmission line 58 by applying a solder 60 to the solderable coating of the radio frequency device.

Turning to FIG. 4, a more generic embodiment of the invention is shown at a cross-sectional view. A first component 64 is shown having a solderable coating 66 applied thereon (illustrated with partial dot shading as in FIG. 3). A solder 68 (illustrated with a wave shading) is applied to the solderable coating 66 of the first component 64. The second component 70 is soldered to the first component 64 via the solderable coating 66 and the solder 68. Thus, the oxidizing metal of the first component 64 is soldered to the second component 70 such that electrical current can flow therethrough. It should be appreciated that the second component 70 may also include a solderable coating (not illustrated) and that the solderable coating 66 may include one or more coating formed by various processes such as those discussed above.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of manufacturing a radio device compound object, comprising:
    creating, via additive manufacturing, an antenna formed at least in part of an oxidizing metal, wherein the antenna is configured to transmit and/or receive wireless signals and includes a base portion with two parallel arms extending transversely from the base portion along a shared plane;
    applying, via vacuum deposition, a solderable coating to at least a portion of the antenna; and
    soldering at least a portion of the antenna to a second component by applying a solder to the solderable coating of the antenna.

2. The method of claim 1, wherein the oxidizing metal from which at least a portion of the antenna is formed is a titanium alloy.

3. The method of claim 2, wherein the titanium alloy is Ti-6Al-4V.

4. The method of claim 1, wherein the oxidizing metal from which at least a portion of the antenna is formed is an aluminum alloy.

5. The method of claim 1, wherein the solderable coating includes at least one of copper or tin-lead.

6. The method of claim 1, further comprising:
    preparing a surface of the antenna, such that the antenna will accept the solderable coating.

7. The method of claim 1,
    wherein the second component is a radio frequency transmission line.

8. A method of manufacturing a radio device compound object, the method comprising:
    creating, via additive manufacturing, a three-dimensional antenna formed at least in part of an oxidizing metal, wherein the three-dimensional antenna is configured to transmit and/or receive wireless signals and includes a base portion with two parallel arms extending transversely from the base portion along a shared plane;
    applying, via vacuum deposition, a first solderable coating to at least a portion of the three-dimensional antenna for soldering; and
    soldering the three-dimensional antenna to a second component by applying a solder to the first solderable coating of the three-dimensional antenna.

9. The method of claim 8, wherein the second component comprises an electrically conductive material.

10. The method of claim 8, further comprising forming, via additive manufacturing, the second component.

11. The method of claim 8, further comprising applying, via physical vapor deposition, a second solderable coating to at least a portion of the second component.

12. The method of claim 8, wherein the oxidizing metal comprises a titanium alloy.

13. The method of claim 12, wherein the first solderable coating comprises at least one of copper, tin, or lead.

14. The method of claim 8, wherein the second component is a radio frequency transmission line.

15. A method of manufacturing a radio device compound object, the method comprising:
    creating, via additive manufacturing, a three-dimensional antenna formed at least in part of a titanium alloy, wherein the three-dimensional antenna is configured to transmit and/or receive wireless signals and includes a base portion with two parallel arms extending transversely from the base portion along a shared plane;
    applying, via physical vapor deposition, a first solderable coating to at least a portion of the three-dimensional antenna for soldering, the first solderable coating comprising at least one of copper, tin, or lead;
    forming, via additive manufacturing, a second component formed at least in part of electrically conductive material; and
    soldering the three-dimensional antenna to the second component by applying a solder to the first solderable coating of the three-dimensional antenna.

16. The method of claim 15, further comprising applying, via physical vapor deposition, a second solderable coating to at least a portion of the second component.

17. The method of claim 15, wherein the second component is a radio frequency transmission line.

\* \* \* \* \*